Aug. 3, 1965     J. L. HARRIS     3,199,012
CONTROL DEVICE
Filed Oct. 9, 1961
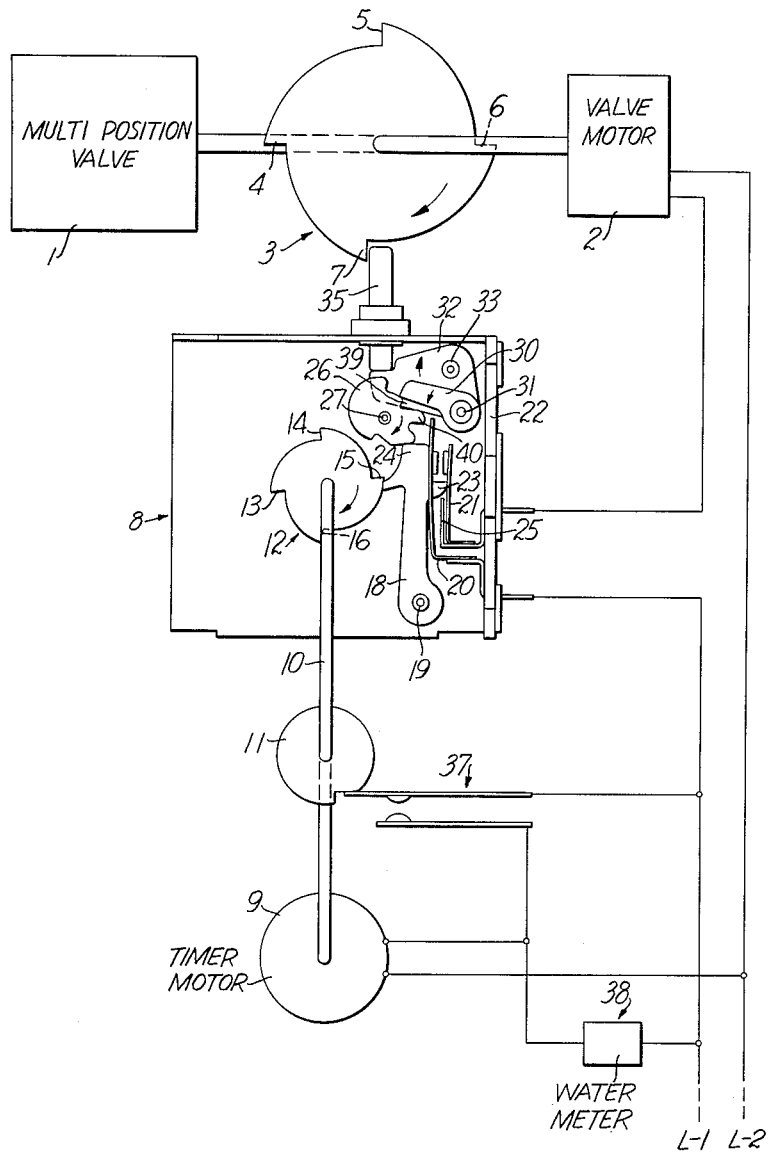
Inventor
John L. Harris

United States Patent Office 3,199,012
Patented Aug. 3, 1965

3,199,012
CONTROL DEVICE
John L. Harris, 4753 N. Newhall St., Milwaukee 11, Wis.
Filed Oct. 9, 1961, Ser. No. 143,610
7 Claims. (Cl. 318—466)

This invention relates in general to automatic controls and more particularly to controls for shifting a control member to predetermined positions in a predetermined sequence.

The primary object of the invention is to provide an electromechanical mechanism in which a single switch is closed in response to an operation by a controller and in which this switch is reopened in response to movement of a second controller.

More particularly, it is an object of the invention to provide a control for a positioning motor in which a switch for such motor is closed in response to a predetermined condition and is reopened to stop the motor when it reaches a predetermined position irrespective of the condition which caused closure of the switch.

Other objects of the invention will appear from the following description and appended claims.

For a full disclosure of the invention, reference is made to the accompanying drawings in which the single figure shows a control system schematically and also shows an elevation of a control unit embodying the invention.

In the drawing the invention is shown applied to an automatic water softener installation. This installation includes a multiposition valve 1. The details of this valve form no part of the invention. However, valves of this type contain a number of ports and serve to control the flow in the water softener to provide positions for "Service," "Brine and Rinse," "Backwash," and "Fast Rinse." The valve illustrated is of the rotary type and is driven by a valve motor 2. The valve shaft is provided with a cam 3 having drop-off sections 4, 5, 6 and 7.

A timer generally indicated as 8 includes a timer motor 9 which drives a cam shaft 10 having cams 11 and 12. The cam 12 is provided with drop-off sections 13, 14, 15 and 16 corresponding to similar drop-offs on the cam 3.

A cam follower 18 is pivoted at 19 and operates switch blades 20 and 21 which are suitably supported on a panel 22. The inner switch blade 20 is provided with an opening through which a projection 23 of the cam follower extends. This projection 23 engages switch blade 21. The cam follower 18 also has an end portion 24 which engages the switch blade 20. Both blades 20 and 21 are biased toward the cam follower and a suitable stop 25 is provided for the switch blade 21 which limits its movement toward the cam follower.

The switch blade 20 also extends over a latch member 26 which is pivoted at 27 and is biased by a spring (not shown) in the direction of the arrow. Rotation of the latch 26 by its spring bias is limited by engagement with the end 24 of the cam follower 18.

The latch 26 is operated by a pawl 30 which is pivoted at 31 to a lever 32 which is pivoted at 33. The pawl 30 is biased toward the latch by a suitable spring. Also, the lever 32 is biased in a clockwise direction by a suitable spring and presses on a pin 35 which rides the cam 3.

The cam 11 operates a switch 37 which is in circuit with the timer motor. A water meter 38 also includes a switch in series with the timer motor. The switch comprising blades 20 and 21 is in circuit with the valve motor 2.

Operation

The parts in the position shown have the multi-position valve in the "Service" position. At this time the switch 20-21 is opened and thus the valve motor 2 is de-energized. When the water meter 38 indicates a predetermined gallonage of water has been used, it closes its switch and energizes the timer motor 9 which drives the cam shaft 10 in a clockwise direction. The cam 11 closes the switch 37 which establishes a new circuit for the timer motor to insure that it makes a full cycle. A short time later the drop-off section 15 of the cam 12 drops the cam follower 18. The blades 20 and 21 move inwardly with the cam follower. However, the blade 20 will engage the latch 26 while blade 21 continues to move. This causes the contacts carried by these blades to engage and energize the valve motor. The valve motor will now run, rotating the valve and the cam 3 in a clockwise direction. This motion of the cam will depress the pin 35 which in turn rotates the lever 32 in a counter clockwise direction which causes movement of the pawl 30 to the right. As this movement continues the pawl 30 will drop into the notch 39 in the latch 26. When the drop-off section 6 of the cam passes from under the pin 35 it releases this pin which in turn releases lever 32 for permitting it to rotate clockwise by means of its spring bias. At this time the pawl 30 is in the notch 39 of the latch and causes rotation of the latch in a counter clockwise direction for releasing the switch blade 20. This switch blade now drops to the cam follower 18 while the switch blade 21 drops to the stop 25. This causes the contacts to open for stopping the valve motor. As the lever 32 continues to rotate in a clockwise direction a portion 40 on the latch engages the pawl 30 and cams it out of the notch 39. The latch is thus released from the pawl at this time.

The timer cam 12 continues to rotate and will raise the cam follower 18. This in turn will raise the switch blades 20 and 21 with the contacts separated. Before the cam follower 18 reaches the top of its stroke the switch blade 20 is moved beyond the latch 26 and the latch 26 is now free to return to the position shown for the next cycle.

Summarizing, it will be seen that the switch 20-21 closes when the cam follower 18 drops into the cam. This causes movement of the valve motor depressing the pin 35. This brings the pawl 30 into operative engagement with the latch 26. When the pin 35 drops off the cam this pawl moves the latch to switch releasing position and the latch itself cams the pawl from engagement therewith so that the latch is free to return to normal latching position. Thus the cam follower by dropping into the cam closes the switch. This cam follower can close the switch only and is incapable of opening it. Also, the latch and release mechanism opens the switch at a predetermined position of the cam 3. This mechanism after opening the switch, clears itself so that the switch will reclose the next time the cam follower drops into the cam. It will be noted that the latching mechanism can open the switch only and is incapable of closing this switch.

The action above described occurs for each step of the two cams, and eventually the system will return to the "Service" position at which the switch 37 opens for stopping the timer motor.

While a preferred form of the invention has been shown and described, it will be apparent that many modifications may be made without departing from the spirit and scope of the invention. It is therefore desired to be limited only by the scope of the appendant claims.

I claim:
1. A control device comprising a first flexible switch blade, a second flexible switch blade, said switch blades being biased in the same direction, co-operating contacts carried by said switch blades, means including a switch operator arranged for moving said switch blades against their bias with said contacts separated to a predetermined position and for releasing the same, a latch arranged to support the blade adjacent said switch operator for causing the contacts to engage when the switch operator releases the switch blades, and means for releasing said latch to permit disengagement of said contacts.

2. A device as set forth in claim 1 in which the latch releasing means includes a pawl which releases the latch after moving the same to releasing position so that the latch is free to return to latching position.

3. In a control device, a switch blade, a latch for holding said switch blade in a predetermined position, and means for releasing said latch, said releasing means including a pawl for engaging said latch to move it to releasing position upon movement of said pawl in one direction, said pawl being arranged to release the latch upon continued movement of the pawl in the same direction to permit the latch to return to latching position.

4. In a control device, a switch blade, a latch for holding said switch blade in a predetermined position, and means for releasing said latch, said releasing means including a pawl for engaging said latch to move it to releasing position upon movement of said pawl in one direction, said latch being arranged to cam the pawl from disengagement therefrom after having been moved to releasing position so that it is free to return to latching position.

5. In a control device for moving control member to predetermined positions, a motor for driving said control member, a switch for controlling said motor, said switch comprising a first flexible switch blade, a second flexible switch blade, said switch blades being biased in the same direction, co-operating contacts carried by said switch blades, means including a switch operator arranged for moving the switch blades against their bias with the contacts separated and for releasing the same, a latch arranged to support the blade adjacent said switch operator for causing the contacts to engage when the switch operator releases the switch blades, means for releasing said switch operator when movement of the control member is required whereby said motor is energized, and means operated upon movement of said control member to a predetermined position for releasing said latch for disengaging said contacts to stop said motor.

6. A device as set forth in claim 5 in which the latch releasing means includes a pawl which releases the latch after moving the same to releasing position so that the latch is free to return to latching position.

7. A control device for moving a control member to predetermined positions, a motor arranged to drive said control member, a switch connected for controlling said motor, means including a first operator for said switch arranged to close the same to start movement of said control member, a second operator for said switch arranged to be actuated upon movement of said control member to a predetermined position, said second operator being arranged when actuated to move the switch to open position and then release the same so that the first operator is conditioned to reclose the switch without any additional movement of the control member.

References Cited by the Examiner

UNITED STATES PATENTS 2,901,615  8/59  Devendorf _____ 318—467 X

ORIS L. RADER, *Primary Examiner.*